(12) United States Patent
Strauss et al.

(10) Patent No.: US 7,900,082 B2
(45) Date of Patent: Mar. 1, 2011

(54) PROCTOR PEER FOR MALICIOUS PEER DETECTION IN STRUCTURED PEER-TO-PEER NETWORKS

(75) Inventors: Thomas Strauss, Esslingen (DE); Marc Drewniok, Stuttgart (DE)

(73) Assignee: Alcatel Lucent, Paris (FR)

( * ) Notice: Subject to any disclaimer, the term of this patent is extended or adjusted under 35 U.S.C. 154(b) by 329 days.

(21) Appl. No.: 12/129,370

(22) Filed: May 29, 2008

(65) Prior Publication Data

US 2008/0313500 A1 Dec. 18, 2008

(30) Foreign Application Priority Data

Jun. 15, 2007 (EP) .................... 07301114

(51) Int. Cl.
*G06F 11/00* (2006.01)

(52) U.S. Cl. ............................. 714/4; 714/48

(58) Field of Classification Search ............ 714/4, 714/37, 47, 48; 709/224, 232
See application file for complete search history.

(56) References Cited

U.S. PATENT DOCUMENTS

| | | | |
|---|---|---|---|
| 5,809,223 A * | 9/1998 | Lee et al. ................... | 714/4 |
| 6,406,426 B1 * | 6/2002 | Reuss et al. ............... | 600/300 |
| 6,425,004 B1 | 7/2002 | Hardjono | |
| 2002/0194319 A1 * | 12/2002 | Ritche ........................ | 709/223 |
| 2004/0006614 A1 * | 1/2004 | DiFalco ..................... | 709/223 |
| 2004/0117439 A1 * | 6/2004 | Levett et al. ............... | 709/203 |
| 2005/0267993 A1 | 12/2005 | Huitema | |
| 2006/0074946 A1 | 4/2006 | Pham | |

FOREIGN PATENT DOCUMENTS

EP 1739897 A1 1/2007

OTHER PUBLICATIONS

Berkeley: "Man page: TRACEROUTE(8)" Internet Citation, Sep. 21, 2000, pp. 1-5, XP002461537.
Xing Jin et al, "Detecting Malicious Hosts in the Presence of Lying Hosts in Peer-to-Peer Streaming", 2006 IEEE, ICME 2006, pp. 1537-1540.

* cited by examiner

*Primary Examiner*—Dieu-Minh Le
(74) *Attorney, Agent, or Firm*—Fay Sharpe LLP

(57) ABSTRACT

A method for detecting misbehavior of a peer node within a P2P network is proposed. The method comprises the step to choose a peer node from that network to act as a tester peer. Such a tester peer sends then a testing request message, that testing request message having as target the tester peer itself. The tester peer analyses the behaviour of the P2P network by collecting any possible response message related to the testing request message. The tester peer identifies any possible discrepancy with properties governed according to the predefined rules of the P2P network. In case a misbehavior is found while being unable to identify the misbehaving peer node then a different peer node from the P2P network is chosen to act as a new tester peer till a misbehaving peer could be identified, or all the peer nodes were tested. In the case a misbehaving peer node is identified then latter is isolated from the P2P network.

9 Claims, 3 Drawing Sheets

PROCTOR PEER FOR MALICIOUS PEER DETECTION IN STRUCTURED PEER-TO-PEER NETWORKS

The invention is based on a priority application EP 07 301 114.0 which is hereby incorporated by reference.

TECHNICAL FIELD

The present invention relates to a method for detecting misbehaviour of a peer node within a peer-to-peer (P2P) network. Furthermore, it is related to a terminal connected to a P2P network, the terminal acting as a tester peer for detecting misbehaviour of a peer node within that P2P network. And it is related to a computer readable medium comprising codes to be executed on a terminal acting as a tester peer, the codes being adapted to detect misbehaviour of a peer node.

BACKGROUND OF THE INVENTION

Network security breaches hinder the application of distributed computing systems manifested as the Grids, clusters, intranets, extranets or P2P systems. Particularly, P2P streaming systems often assume that hosts are cooperative. However, this may not be true in the open environment of the INTERNET.

Peer-to-peer (P2P) communication, and in fact all types of communication, depend on the possibility of establishing valid connections between selected entities. However, entities may have one or several addresses that may vary because the entities move within the network, the topology changes or/and address lease cannot be renewed. A classic architectural solution to this addressing problem is thus to assign to each entity a stable name, and to "resolve" this name to a current address when a connection is needed. This name to address translation must be very robust and it must also allow for easy and fast updates.

To increase the likelihood that an entity's address may be found by those seeking to connect to it, many peer-to-peer protocols, including the Peer Name Resolution Protocol (PNRP), allow entities to publish their address through various mechanisms. Some protocols also allow a client to acquire knowledge of other entities' addresses through the processing of requests from others in the network. Indeed, it is this acquisition of address knowledge that enables successful operation of peer-to-peer networks. That is, the better the information about other peers in the network, the greater the likelihood that a search for a particular resource will converge.

However, without a robust security infrastructure underlying the peer-to-peer protocol, malicious entities can easily disrupt the ability for such peer-to-peer systems to converge. Such disruptions may be caused, for example, by an entity that engages in identity theft. In such an identity theft attack on the peer-to-peer network, a malicious node publishes address information for identifications (IDs) with which it does not have an authorized relationship, i.e. it is neither the owner nor a group member, etc. A malicious entity could also intercept and/or respond first before the good node responds, thus appearing to be the good node.

Commonly, P2P network attacks may attempt to disrupt or exhaust node or network resources. In PNRP, a malicious entity could also obstruct PNRP resolution by flooding the network with bad information so that other entities in the network would tend to forward requests to nonexistent nodes (which would adversely affect the convergence of searches), or to nodes controlled by the attacker. PNRP's name resolution ability could also be degraded by modifying the RESOLVE packet used to discover resources before forwarding it to a next node, or by sending an invalid RESPONSE back to the requester that generated the RESOLVE packet. A malicious entity could also attempt to disrupt the operation of the peer-to-peer network by trying to ensure that searches will not converge by, for example, instead of forwarding the search to a node in its cache that is closer to the ID to aid in the search convergence, forwarding the search to a node that is further away from the requested ID. Alternatively, the malicious entity could simply not respond to the search request at all. The PNRP resolution could be further hampered by a malicious node sending an invalid BYE message on behalf of a valid ID. As a result, other nodes in the cloud will remove this valid ID from their cache, decreasing the number of valid nodes stored therein.

While simply validating address certificates may prevent the identity theft problem, this is ineffective against an attack that impedes PNRP resolution. An attacker can continue to generate verifiable address certificates (or have them pre-generated) and flood the corresponding IDs in the peer-to-peer cloud. If any of the nodes attempts to verify ownership of the ID, the attacker would be able to verify that it is the owner for the flooded Ids because, in fact, it is. However, if the attacker manages to generate enough Ids it can bring most of the peer-to-peer searches to one of the nodes it controls. Once a malicious node brings the search to controlled node, the attacker fairly controls and directs the operation of the network.

A malicious node may also attempt a denial of service (DoS) attack. When a P2P node changes, it may publish its new information to other network nodes. If all the nodes that learn about the new node records try to perform an ID ownership check, a storm of network activity against the advertised ID owner will occur. Exploiting this weakness, an attacker could mount an internet protocol (IP) DoS attack against a certain target by making that target very popular. For example, if a malicious entity advertises an Internet Website IP address as the updated node's ID IP, all the nodes in the peer-to-peer network that receive this advertised IP will try to connect to that IP to verify the authenticity of the record. Of course, the Website's server will not be able to verify ownership of the ID because the attacker generated this information. However, the damage has already been done. That is, the attacker convinced a good part of the peer-to-peer community to flood the IP address with validation requests and may have effectively shut it down.

In US 2003/0226033 is described a method based on the main step that when a program is received by a computer system, whether through introduction by a user or from a peer computer system, the computer system queries a database of blacklisted programs. If the received program is found in the blacklist database, the computer system does not allow the received program to run. If the received program is not found in the blacklist database, the computer system scans the received program to determine whether the received program might cause an undesired behaviour if it were to run on the computer system. If the computer system determines that the received program could cause an undesired behaviour, the computer system adds the received program to the blacklist database and does not allow the received program to run on the computer system. But such a solution is rather very limited since is successful only for programs that are already blacklisted. It can not really detect a malicious peer.

In US 2006/0179139 is described a security infrastructure and methods are presented that inhibit the ability of a malicious node from disrupting the normal operations of a peerto-peer network. The methods of the invention allow both secure an insecure identities to be used by nodes by making them self-verifying. When necessary or opportunistic, ID ownership is validated by piggybacking the validation on existing messages. The probability of connecting initially to a malicious node is reduced by randomly selecting to which node to connect. Further, information from malicious nodes is identified and can be disregarded by maintaining information about prior communications that will require a future response. Denial of service attacks are inhibited by allowing the node to disregard requests when its resource utilization exceeds a predetermined limit. The ability for a malicious node to remove a valid node is reduced by requiring that revocation certificates be signed by the node to be removed. Such a solution does not solve the problem entirely since the malicious node can still act i.e. is not somehow deactivated.

In US 2006/0215575 is described a solution based on the analysis of some statistics associated to the overall health of a P2P while that statistics are gathered and analyzed pertaining to individual node and node-to-node performance within the P2P network. When used with live P2P networks, the health statistic may provide a real-time view into network performance. Such a view may be used to adjust P2P network topology or to isolate underperforming or malicious nodes. But such a solution is based on supplementary hardwares like a controller and further instrumentations.

In the paper from Xing Jin et al. "Detecting malicious hosts in the presence of lying hosts in peer-to-peer streaming", ICME 2006, pages 1537-1540, is discussed how to detect malicious hosts (e.g., with attacking actions and abnormal behaviour), based on their history performance. In the proposed system, each host monitors the performance of its neighbour(s) and reports this to a server. Based on the reports, the server computes hosts reputation with hosts of low reputation being malicious. A problem is that hosts may lie by submitting forged reports to the server. To overcome that problem is proposed in the paper from Xing Jin et al. to formulate the reputation computing problem in the process of lying hosts as a minimization problem and to solve it by the traditional Levenberg-Marquardt algorithm. But such solution is far to be satisfactory.

SUMMARY OF THE INVENTION

In view of the above, it is an object of the present invention to detect a malicious peer in an accurate enough way to be able to isolate it without implying too much further costs.

This object is achieved in accordance with the invention by a method for detecting misbehaviour of a peer node within a P2P network. The method comprises the step to choose a peer node from that network to act as a tester peer. Such a tester peer sends then into the P2P network a testing request message, that testing request message having as target the tester peer itself. The tester peer analyses the behaviour of the P2P network by collecting any possible response message related to the testing request message. The tester peer identifies any possible discrepancy with properties governed according to the predefined rules of the P2P network within the received response message to the testing request message. And in case a misbehaviour is found while being unable to identify the misbehaving peer node then a different peer node from the P2P network is chosen to act as a new tester peer. That new proctor or tester peer acts in the same way as the previous tester peer by applying the above same steps. In that case, the method comprises also the step to compare the identification results obtained by the different tester peers to try to identify the misbehaving peer node. In the negative case where no misbehaving peer node could be detected then the above detection procedure is possibly apply a further time by choosing another different peer node from the P2P network. Such a method can be applied till a misbehaving peer could be identified, or all the peer nodes were tested. Alternatively, such a method could be applied regularly possibly after some pre-defined time interval. In the case a misbehaving peer node is identified then it is isolated from the P2P network by discarding it from that network possibly but not exclusively by updating the pre-defined rules governing that P2P network.

In an alternative according to the invention at least two peer nodes from the P2P network are chosen to act as tester peers. In that case, the testing request messages sent into the P2P network to try to identify the misbehaving peer is sent by one of the two tester peers with this time as target of the testing request message the other tester peer. The analyze of the behaviour of the P2P network is performed by that other tester peer comparing the received response message to the testing request message with corresponding testing request message with same target sent directly to that other tester peer without following a path according to the predefined rules governing the P2P network.

In the case a misbehaviour is found without being able to identify the misbehaving peer node then a different peer node is chosen from the P2P network to act as a new tester peer. That step is applied till a possible misbehaviour peer node is surrounded i.e. is isolated from the P2P network. In some specific alternative, the predefined rules governing the P2P network concern routing rules and paths to be used when forwarding some request within that network.

The invention further relates to a terminal being part of a P2P network, the terminal acting as a tester peer with a computer storage medium comprising codes adapted to perform the steps from the detection method as described above. In case a misbehaviour is found without being able to identify this behaving peer node then the terminal releases the testing peer property to be handed out to another terminal of the P2P network. This latter terminal with the testing peer property will act as a new proctor or tester peer and apply the detection method according to the invention.

In some embodiment according to the invention, the terminal acts as a tester peer together with at least a second terminal of that P2P network. In that case, those two tester peers have each a computer storage medium comprising codes adapted to perform the corresponding detection method. Latter detection method is such that one of the two tester peer sends into the P2P network testing request message with as target of the testing request message the other tester peer. The analysing and identification steps are performed by the target tester peer comparing the received response message to the testing request message with a corresponding testing request message with same target sent directly from the first to the second tester peer without applying a path according to the predefined rules governing the P2P network.

The invention also relates to a P2P network governed according to predefined rules and comprising a terminal acting as a tester peer as described above.

Advantageous developments of the invention are described in the dependent claims, the following description and the drawings.

DESCRIPTION OF THE DRAWINGS

An exemplary embodiment of the invention will now be explained further with the reference to the attached drawings in which.

DETAILED DESCRIPTION OF PREFERRED EMBODIMENTS

Figure 1:
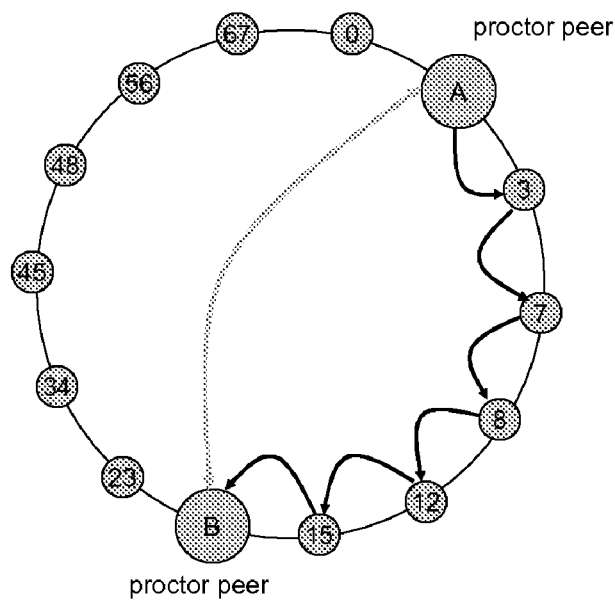
FIG. 1 is a schematic view of a P2P network when applying the method according to the invention.

According to the invention a so-called proctor or tester peer is defined under the terminals of the P2P network to be analysed. The choice of the first terminal to act as a tester peer can be made randomly or applying some predefined rules. It is then such first elected tester peer which tries to determine if a structured P2P network is not behaving in a valid way when a request is forwarded to that P2P network. The tester peer checks via test messages sections of this network and validate them. In such a way, it can detect a so called malicious peer which behaviour is not adequate to the applied P2P algorithm. This means if a request is passing such a peer, the answer of this request may not be successful or/and correct.

The three following misbehaviour of a malicious node or peer can be detected when implementing a solution according the invention.

Misrouting of requests: a request is not routed according to the specified algorithm for this P2P network. This disturbs the routing and probably will lead to failed requests which normally could be answered successfully.

Blocking request: A request is blocked intentionally by the malicious node in order to thwart a successful response.

Content manipulation: The content of a request is changed in an analogue and malicious way by the malicious node. This can have several consequences like failed requests or wrong responses. Intentionally manipulated responses can also result in further problems as their requesting peer works with wrong information.

When implementing a solution according to the invention, mainly two possibilities can be chosen. In one case a single proctor or tester peer is chosen which sends a testing P2P request that will eventually return to itself. The request introduced by the proctor or tester peer into the P2P network must have as a final target the tester peer itself. And according to the time or other parameters to be collected by the tester peer when receiving back the forwarded test request, the tester peer will then be able or not to identify a misbehaviour or even better the misbehaving malicious node.

An alternative embodiment according to the invention is based on the use of two nodes as proctor or tester peers. Their positions within the P2P network frames the area of the P2P network to test. Indeed, after testing an area successfully the testing property can be handed out to another terminal to define a new area of the P2P network to be analysed. It is also possible within the invention to have more than two proctor peers running at the same time. This will increase the speed to detect a malicious peer within the P2P network to analyse.

In any case, the tester peers knows the applied P2P algorithm for the P2P network in order to test a section for the network. The tester peers according to the invention can be used for any kind of structured P2P network. For the following illustrations, a ring-like network is used as shown on FIG. 1 to 5. But the invention could be implemented on networks with a different topology.

The testing procedure according to the invention is as follows:

On FIG. 1 is shown a P2P network with a certain amount of nodes all distributed on some kind of ring topology. This topology defines the pre-defined rules according to which the P2P network is governed, i.e. the rules to apply when transmitting or forwarding any kind of requests within that P2P network. Two of the nodes from that P2P network namely A and B are chosen to act as tester or proctor peer. When implementing the method according to the invention, the proctor peer A (being any kind of terminal interacting within a P2P network) sends a testing request message into the P2P network with as target the other proctor peer B. Such request is forwarded within the P2P network from one node to another node according to the predefined rules governing that network. On FIG. 1 is shown such a forwarding by the small arrows starting at proctor peer A to the direct neighbour node 3 and being successively forwarded to the following neighbours 7, 8, 12, 15 till reaching the second proctor peer B.

The tester or proctor peer B analyses the received testing request message forwarded by its neighbour node 15 by comparing it to a second testing request message directly transmitted from proctor peer A to proctor peer B. Such direct transmission is shown on FIG. 1 by the big arrow between A and B and could use different kind of rules allowing such a direct connection within a P2P network. Such direct link could be based for example on chord finger or chord successor from the P2P algorithm. An alternative for such direct link could be given by the use of so-called social fingers (buddies from a buddy list) which initiates some kind of application (messaging tool, VoIP tool). Another alternative could be given by the use of last connected peers.

The analyse of the behaviour of the P2P network could also be performed by the initial proctor peer A by collecting all the request messages forwarded by the proctor peer B following the direct link shown on FIG. 1 with the big arrow. In the present case shown on FIG. 1, no misbehaviour can be detected which means that no malicious nodes are present between the two proctor peers A and B. The testing request message sent by the proctor peer A followed correctly the predefined rules governing that network.

Figure 2:
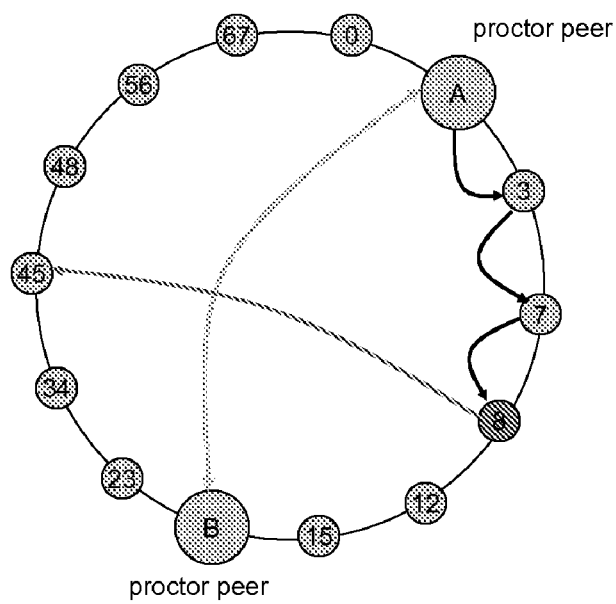
FIGS. 2 to 4 are schematic view of the P2P network with 2 nodes acting as tester nodes according to the invention.

On FIG. 2 is shown a different situation with one of the nodes from a P2P network being a malicious one. Latter being the node 8 is between the 2 elected proctor peers A and B. In that case and as shown on FIG. 2, the testing request message sent by the proctor peer A does not reach the proctor peer B since the malicious node 8 is located inbetween those two proctor or tester peers A and B. Hence, the malicious node 8 when receiving that testing request message from its neighbour node 7 forwarded it following wrong rules like e.g. towards another node 45 and not its direct second neighbour node 12 hence violating the pre-defined rules governing that P2P network. The two proctor peers A and B are able to identify a misbehaviour but still not able to localize the malicious node. In that case, the testing peer property affected to the terminals acting as proctor peer namely A and B are released at handed-out to another terminal or node of the P2P network.

Figure 3:
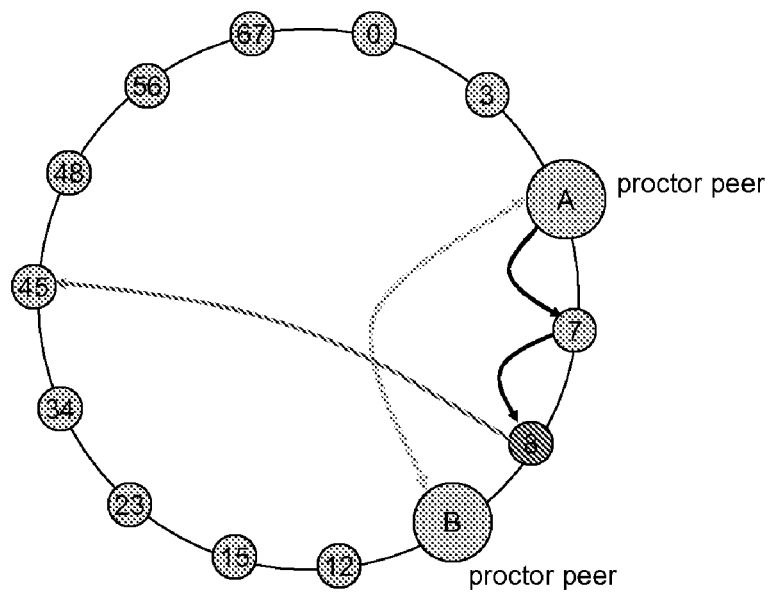
Figure 4:
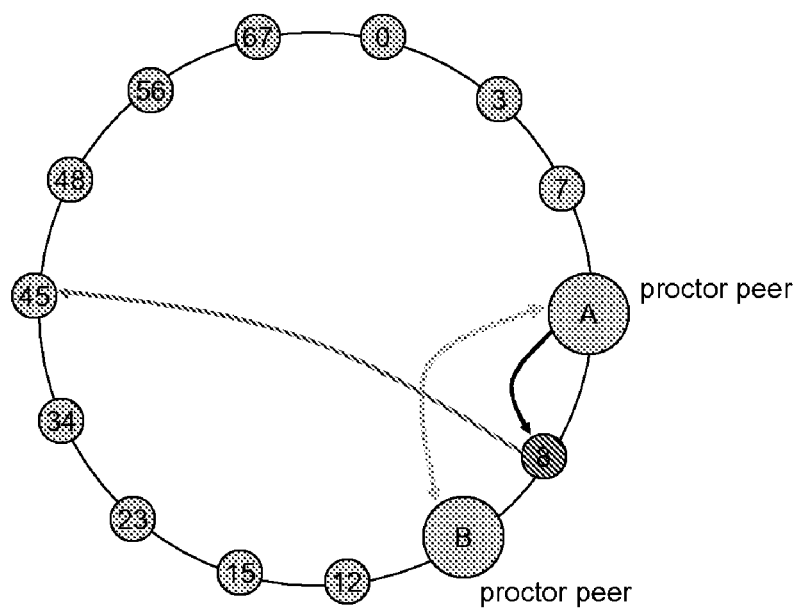

On FIG. 3 is shown to which is handed-out the testing peer property so that now the two proctor or tester peers A and B have only two nodes 7 and 8 between them. Here, a simple procedure is chosen by handing out the testing peer property to the two nodes neighbour to the initially chosen proctor peers such that the area under test is reduced. A different procedure could be chosen e.g. by handing it out to the next but one neighbour to try to speed up the detection method. And than the detection method according to the invention is applied by the new elected proctor peers A and B. In the case that the testing request message forwarded by the proctor peer A fulfils all the predefined rules when reaching the second proctor peer B then it is a hint that the area under test does not comprise a malicious node. If nevertheless a malicious node is present on the P2P network then the area to test must be changed till that malicious node is localized as it is the case on FIG. 4 where finally the two proctor peers A and B have been able to detect the malicious peer 8. The optimal algorithm for shrinking the area to test depends on the underlying P2P network i.e. the predefined rules governing that network.

Figure 5:
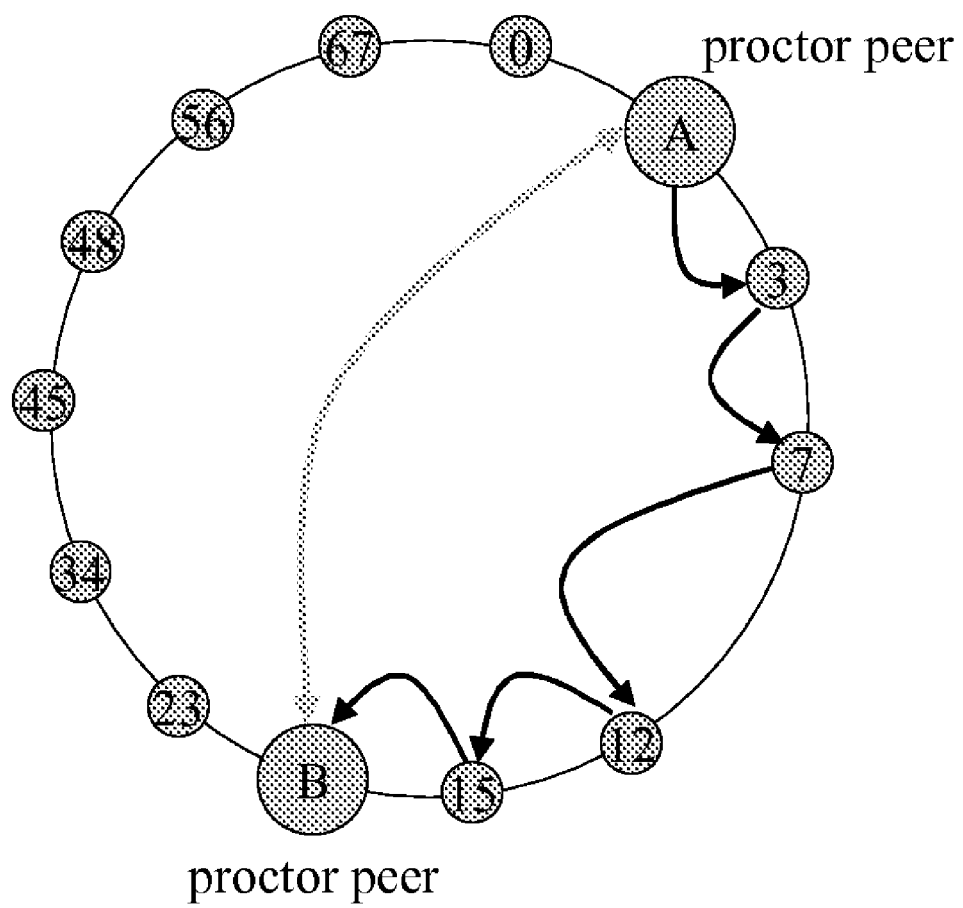
FIG. 5 is a schematic view of the P2P network after eliminating the identified malicious node.

On FIG. 5 is shown the P2P network after having adapted the predefined rules governing that network to render the localised malicious node 8 inactive. In the case shown on FIG. 5 the malicious node was simply excluded from the P2P network so that any message to forward on that network will jump from node 7 to node 12 avoiding the node 8 in between. Other possible way to render the malicious node inactive could be applied.

The detection of malicious peers or nodes is a basic requirement to build a stable and robust P2P network. The implementation of the solution according to the invention allows to build a strategy against damages produces by some malicious peer in an appropriate way e.g. by excluding it.

The invention claimed is:

1. A method for detecting misbehaviour of a peer node within a peer-to-peer [P2P] network governed according to predefined rules, the method comprises the following steps of:
    a) choosing a peer node from the P2P network to act as a tester peer;
    b) sending into the P2P network a testing request message from the tester peer, that testing request message having as target the tester peer itself;
    c) analysing by the tester peer of the behaviour of the P2P network by collecting any response message related to the testing request message;
    d) identifying by the tester peer from received response message to the testing request message any discrepancy with properties governed according to the predefined rules;
    e) in case a misbehaviour is found without being able to identify the misbehaving peer node then choosing a different peer node from the P2P network to act as the tester peer and applying accordingly steps b to d;
    f) comparing the identification results obtained by the different tester peers to try to identify the misbehaving peer node and in the negative case restarts a detection procedure by choosing another different peer node from the P2P network and applying steps b to f;
    g) when identifying a misbehaving peer node then discarding it from the P2P network by updating the predefined rules governing the P2P network.

2. The detection method according to claim 1 wherein at the step a) at least two peer nodes from the P2P network are chosen to act as tester peers with the testing request message sent at step b) into the P2P network by one of the two tester peers with as target of the testing request message the other tester peer while step c) and d) are performed by comparing the received response message to the testing request message with a corresponding testing request message with same target sent to the other tester peer without following a path according to the predefined rules governing the P2P network.

3. The detection method according to claim 2 wherein in case a misbehavior is found without being able to identify the misbehaving peer node then choosing at least a different peer node from the P2P network to act as the tester peer to attempt to surround a possible misbehaving peer node.

4. The detection method according to claim 1 wherein the predefined rules concern routing rules and paths to be used when forwarding some request within the P2P network.

5. The detection method according to claim 2 with the corresponding testing request message with same target sent directly to the other tester peer without following a path according to the predefined rules governing the P2P network.

6. A peer-to-peer (P2P) network governed according to predefined rules, the P2P network including a first terminal and a second terminal connected to the P2P network, the two terminals acting together as tester peers having a computer storage medium comprising codes adapted to perform the following steps:
    sending into the P2P network a testing request message by one of the tester peers having as target of the testing request message the other of the tester peers;
    analysing by the other of the tester peers of the behaviour of the P2P network by collecting a response message related to the testing request message;
    comparing the response message with a corresponding testing request message with same target sent to the other of the tester peers without applying a path according to the predefined rules governing the P2P network;
    in case a misbehaviour is found without being able to identify the misbehaving peer node then releasing testing peer property by the one of the terminals, such testing peer property being handed out to another terminal of the P2P network.

7. The terminal according to claim 6 with the corresponding testing request message with same target sent directly to the other tester peer without following a path according to the predefined rules governing the P2P network.

8. A method for detecting misbehaviour of a peer node within a peer-to-peer [P2P] network governed according to predefined rules, the method comprises the following steps of:
    a) choosing at least two peer nodes from the P2P network to act as a tester peers;
    b) sending into the P2P network a testing request message by one of the two tester peers with the other testing peer as the target of the testing request message;
    c) analysing by the other tester peer the behaviour of the P2P network by collecting any response message related to the testing request message;
    d) comparing the received response message to the testing request message with a corresponding testing request message with same target sent to the other testing peer without following a path according to the predefined rules governing the P2P network;
    e) in case a misbehaviour is found without being able to identify the misbehaving peer node then choosing a different peer node from the P2P network to act as the tester peer to attempt to surround the misbehaving peer node and applying accordingly steps b to d;
    f) comparing the identification results obtained by the different tester peers to try to identify the misbehaving peer node and in the negative case restarting a detection procedure by choosing another different peer node from the P2P network and applying steps b to f; and
    g) when identifying a misbehaving peer node then discarding it from the P2P network by updating the predefined rules governing the P2P network.

9. The method according to claim 8 wherein the predefined rules concern routing rules and paths to be used when forwarding some request within the P2P network.

* * * * *